US010885902B1

(12) United States Patent
Papania-Davis et al.

(10) Patent No.: US 10,885,902 B1
(45) Date of Patent: Jan. 5, 2021

(54) NON-SEMANTIC AUDIO STENOGRAPHY (71) Applicant: X Development LLC, Mountain View, CA (US)

(72) Inventors: Antonio Raymond Papania-Davis, Oakland, CA (US); Bin Ni, Fremont, CA (US); Shelby Lin, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 171 days.

(21) Appl. No.: 16/198,024

(22) Filed: Nov. 21, 2018

(51) Int. Cl.
*G10L 15/00* (2013.01)
*G10L 15/18* (2013.01)
*G10L 15/22* (2006.01)

(52) U.S. Cl.
CPC .......... *G10L 15/1815* (2013.01); *G10L 15/22* (2013.01)

(58) Field of Classification Search
CPC .............................. G10L 15/1815; G10L 15/22
USPC ............. 704/4, 8, 9, 210, 235, 275; 707/754
See application file for complete search history.

(56) References Cited

U.S. PATENT DOCUMENTS

| 9,413,891 | B2 | 8/2016 | Dwyer et al. |
| 1,031,145 | A1 | 6/2019 | McCord |
| 2015/0194151 | A1* | 7/2015 | Jeyachandran ......... G10L 15/20 704/233 |
| 2019/0066686 | A1* | 2/2019 | Baracaldo Angel ........................ G06F 21/6245 |

* cited by examiner

*Primary Examiner* — MD S Elahee
(74) *Attorney, Agent, or Firm* — Fish & Richardson P.C.

(57) ABSTRACT

Techniques are described for using stenography to protect sensitive information within conversational audio data by generating a pseudo-language representation of conversational audio data. In some implementations, audio data corresponding to an utterance is received. The audio data is classified as likely sensitive audio data. A particular set of sentiments associated with the audio data is determined. Data indicating the particular set of sentiments associated with the audio data is provided to a model. The model is trained to output, for each of different sets of sentiments, desensitized, pseudo-language audio data that exhibits the set of sentiments, and is not classified as likely sensitive audio data. A particular desensitized, pseudo-language audio data is received from the model. The audio data is replaced with the particular desensitized, pseudo-language audio data and stored within an audio data repository.

20 Claims, 5 Drawing Sheets

NON-SEMANTIC AUDIO STENOGRAPHY

TECHNICAL FIELD

This specification generally describes technology related to audio data processing, and more particularly, to technology related to stenography.

BACKGROUND

Various methodologies can be used to hide content (including text, sound, or images) in a multimedia file. For example, in data networking and computer-based communications, techniques can be used to insert text data or image data into another image in a hidden manner that is not recognizable to someone viewing the image. In other examples, techniques can be used to hide video in another video file, sound in another sound file, or sound in a video file, etc. The image, sound, or video that is used to hide the underlying message is often referred to as a carrier, cover file and/or a signal.

SUMMARY

Conversational audio data often includes sensitive information such as personally identifiable information, or secure financial information. This imposes challenges on processing conversational audio data collected on personal electronic devices to extract information such as user behavioral patterns, user satisfaction, or user responsiveness that might be useful for data analysis or pattern recognition. Additionally, because many data processing techniques often involve storing data in the cloud, storage of conversational audio data on cloud-based server systems often creates various privacy concerns. To address these privacy concerns, data processing systems often temporarily store conversational audio data during processing, and delete storage instances shortly afterwards, thereby limiting their use in longer-term historical pattern recognition and/or data analysis.

To address these and other limitations, the present disclosure describes a system that is capable of using stenography to protect sensitive information within conversational audio data by generating a pseudo-language representation of conversational audio data. The pseudo-language representation can include identical or similar non-semantic features as the input audio data, e.g., sentiments, sentiment patterns, tonality, parity, rhythm, emphasis, etc., but does not include semantic content. For example, a pseudo-language representation of recorded telephone conversation of a user with a customer service representative can identify that the user was upset about his credit number during the conversation but not the actual credit number itself. In this way, the system can store pseudo-language representation in lieu of the conversational audio data so that non-semantic information associated with a conversation, e.g., customer satisfaction, customer sentiment, service quality, etc., is protected by obfuscation and therefore prevents having to store sensitive information.

In a typical operation, the system uses a classifier to classify input conversational audio data as likely including sensitive information, e.g., information that a user would consider to be private or not stored on a cloud-based server. The system identifies portions of the conversational audio data that include sensitive information and determines non-semantic features associated with the identified portions. As examples, non-semantic features can include associated sentiments, sentiment patterns represented by the associated sentiments, or acoustic features of the received audio data, such as tonality, rhythm, parity, emphasis, among others. The system provides the non-semantic features to a desensitization model that is trained to output desensitized, pseudo-language audio data for a given set of one or more input features.

The desensitization model generates the pseudo-language language audio data so that non-semantic features of the original conversational audio data are retained but semantic content of the audio data is obscured, redacted, or otherwise unidentifiable. In some implementations, the desensitization model generates the pseudo-language audio data using association data that maps a particular feature to a set of one or more pseudo-language segments determined to exhibit the particular feature. For example, the association data can specify a set of pseudo-language segments that exhibit an "angry" sentiment (segments of obscured audio data having acoustic features of conversations in which a speaker is angry). In such implementations, the desensitization model can determine pseudo-language segments that correspond to portions of the audio data having sensitive information, i.e., segments having similar or identical non-semantic features. The desensitization model can combine the pseudo-language segments along a similar arrangement as the portions of the audio data so that the generated pseudo-language audio data retains the same non-semantic features as the original conversational audio data but obscures the sensitive information.

In one general aspect, a computer-implemented method includes: receiving audio data corresponding to an utterance; determining that the received audio data is classified as likely sensitive audio data; determining a particular set of one or more sentiments that are associated with the received audio data that is classified as likely sensitive audio data; providing data indicating the particular set of one or more sentiments that are associated with the received audio data that is classified as likely sensitive audio data, to a model that is trained to output, for each of different sets of sentiments, desensitized, pseudo-language audio data that (i) exhibits the set of sentiments, and (ii) is not classified as likely sensitive audio data; receiving, from the model, particular desensitized, pseudo-language audio data that (i) exhibits the particular set of one or more sentiments that are associated with the received audio data that is classified as likely sensitive audio data, and (ii) is not classified as likely sensitive audio data; replacing the audio data that is classified as likely sensitive audio data with the particular desensitized, pseudo-language audio data within an audio data repository; and storing the particular desensitized, pseudo-language audio data in the audio data repository in association with the utterance.

One or more implementations can include the following optional features. For instance, in some implementations, the method further includes: determining a particular sentiment pattern represented by the particular set of one or more sentiments that are associated with the received audio data that is classified as likely sensitive audio data. In such implementations, the pseudo-language audio data exhibits a sentiment pattern that satisfies a threshold similarity to the particular sentiment pattern represented by the particular set of one or more sentiments that are associated with the received audio data that is classified as likely sensitive audio data.

In some implementations, the particular sentiment pattern specifies (i) one or more audio segments of the received audio data that is classified as likely sensitive audio data, and (ii) a subset of the particular set of one or more sentiments that are associated with each of the one or more audio segments.

In some implementations, the model outputs the particular desensitized, pseudo-language audio data by: identifying a set of non-semantic features represented by one or more portions of the audio data that are classified as likely sensitive audio data; identifying, for each sentiment included in the particular set of one or more sentiments, a set of pseudo-language segments that are determined to be associated with the same sentiment; selecting, from among the identified sets of pseudo-language segments, a particular subset of pseudo-language segments based on the identified set of non-semantic features represented by the audio data corresponding to the utterance; and generating the particular desensitized, pseudo-language audio data based on combining the particular subset of pseudo-language segments.

In some implementations, the particular subset of pseudo-language segments includes at least one pseudo-language segment that is determined to be associated with a sentiment included in the particular set of one or more sentiments.

In some implementations, determining that the received audio data is classified as likely sensitive audio data includes: determining a particular semantic content associated with the utterance; providing data indicating the particular semantic content associated with the utterance to a classifier that is trained to output, for each of different types of semantic content, a score representing a likelihood that semantic content represents sensitive information; receiving, from the classifier, a particular score computed for the particular semantic content associated with the utterance; and determining that the particular score satisfies a threshold associated with sensitive audio data.

In some implementations, the audio data includes one or more audio segments; and determining the particular set of one or more sentiments that are associated with the received audio data that is classified as likely sensitive audio data includes determining, for each of the one or more audio segments, a particular subset of one or more sentiments that are associated with the audio segment.

In some implementations, each segment from among the one or more segments includes a word associated with a transcription of the utterance.

In some implementations, each segment from among the one or more segments includes a sentence associated with a transcription of the utterance.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
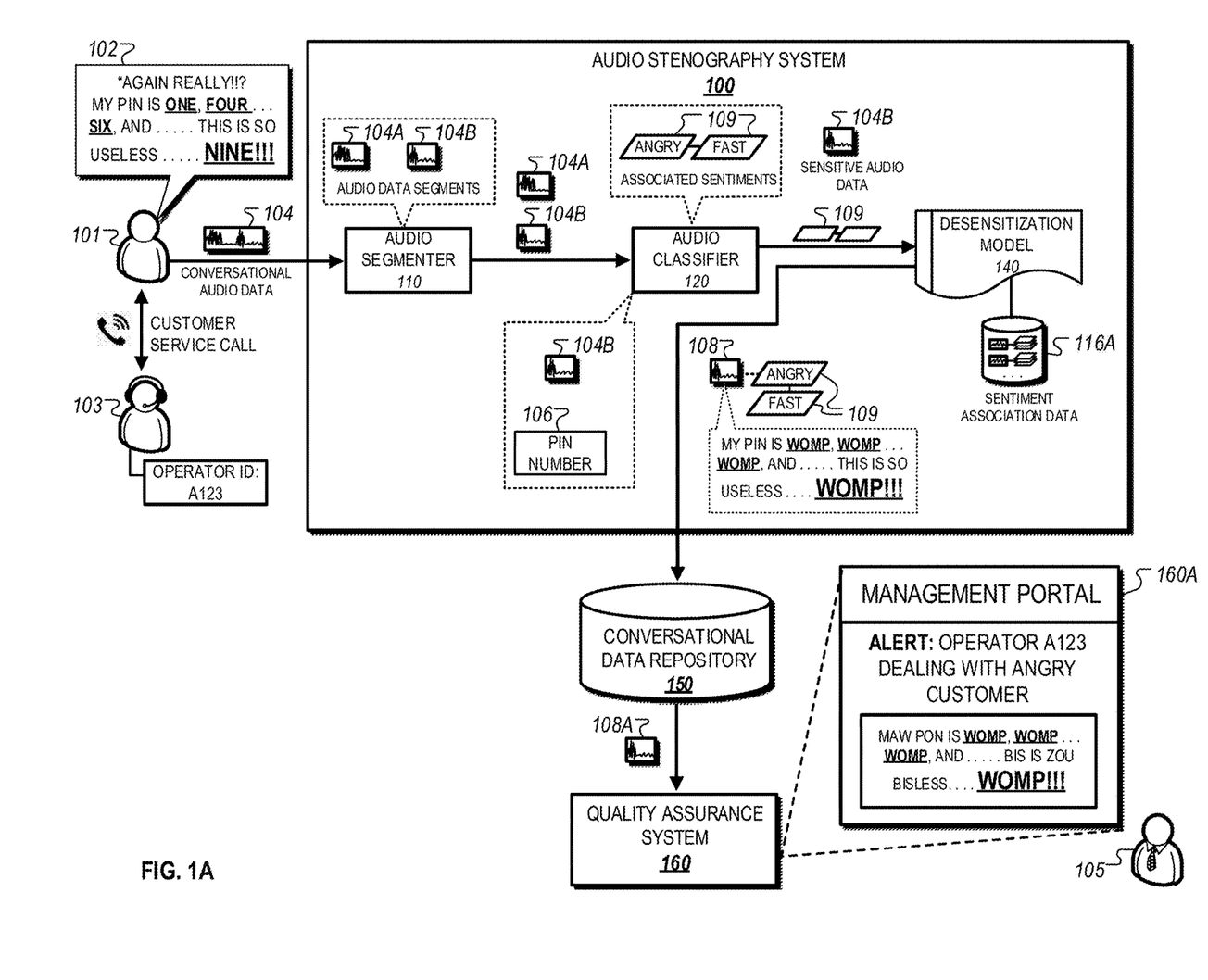
FIG. 1A illustrates an example of a system that is capable of generating desensitized, pseudo-language audio data.

FIG. 1A illustrates an example of a stenography system 100 that is capable of generating desensitized, pseudo-language audio data. The system 100 includes audio segmenter 110, audio classifier 120, and a desensitization model 140. The system 100 stores audio data in a conversational data repository 150, which is accessed by a quality assurance system 160.

In the example depicted in FIG. 1A, the audio segmenter 110 receives audio data 104 corresponding to an utterance spoken by a user 101. The audio data 104 is a recorded conversation between the user 101 and a customer service representative 103 during a telephonic customer service call. As shown, the user 101 provides dialogue 102 during the service call that indicates that he/she is frustrated or angry with the conversation.

The audio segmenter 110 processes the audio data 104 to identify different segments. The segments can represent, for example, individual words or sentences of the dialogue 102. In the example depicted in FIG. 1A, the audio segmenter 110 identifies two audio segments 104A and 104B for the audio data 104. In this example, audio segment 104A represents a portion of the audio data 104 corresponding to "AGAIN REALLY!!?" and audio segment 104B represents another portion of the audio data 104 corresponding to "MY PIN IS ONE, FOUR, SIX, AND THIS IS SO USELESS . . . NINE!!!"

The audio classifier 120 parses each of the audio segments 104A and 1046 to determine whether the audio data 104 likely includes sensitive information. In the example depicted in FIG. 1A, the audio classifier 120 classifies the audio segment 104B as likely representing sensitive audio data based on determining that its sentiment content is associated with personal identifier number (PIN) 106. In this example, PIN number 106 is identified as a user's financial account information and therefore the audio segment 104B is determined to likely include information that the user 101 expects to keep private.

The audio classifier 120 processes the audio segment 104B to identify non-semantic features that are exhibited by the audio segment 1046. In the example depicted in FIG. 1A, the audio classifier 120 identifies sentiments 109 related to the dialogue 102. In this example, the sentiments 109 include "ANGRY" since, for instance, the tone and rhythm of the dialogue 102 indicates that the user 101 is angry during the telephone conference with the customer service representative 103. The sentiments 109 also include "SLOW" to represent the speed by which the user 101 speaks the PIN number 106.

The desensitization model 140 receives the sentiments 109 as input and generates desensitized, pseudo-language audio data 108 based on sentiment association data 116. The desensitization model 140 is trained to generate the pseudo-language audio data 108 such that the output retains identical or similar non-semantic features as the audio data 104 but is modified to obscure, modify or remove sensitive information, as discussed below in reference to FIG. 2.

In the example depicted in FIG. 1A, the pseudo-language audio data 108 retains the overall structure of the dialogue 102, e.g., clauses that do not refer to sensitive information and identical or similar spacing between speech portions. Additionally, the pseudo-language audio data 108 replaces spoken portions of the audio data 104 that refer to the PIN number 106 with obscured audio segments that include gibberish, e.g., "WOMP."

Once generated, the pseudo-language audio data 108 can be stored in the conversational data repository 150 in lieu of the audio data 104. This ensures that the data stored in the conversational data repository 150 does not reference any private and/or sensitive information. For instance, in the example depicted in FIG. 1A, the conversational data repository 150 stores the pseudo-language audio data 108 so that the PIN number 106 of the user 101 is not identifiable from the stored data. However, because the pseudo-language audio data 104 has identical or similar non-semantic features as the audio data 104, stored data can be processed to identify pertinent information, e.g., determining that the user 101 is angry during the telephone call.

In some instances, the pseudo-language audio data 108 is further processed to remove any identifiable linguistic features prior to storage in the conversational data repository 150. For example, as shown in FIG. 1A, the portions of the pseudo-language audio data 108 that were not adjusted by the desensitization model 140 can be obscured or adjusted so that speech provided by the user 101 is adjusted so that no speech is identifiable in pseudo-language audio data 108A retrieved from the conversational data repository 150 and provided for output to the quality assurance system 160.

The information stored in the conversational data repository 150 is processed to identify trends and/or patterns of significance within stored audio data. In the example depicted in FIG. 1A, the quality assurance system 160 processes the pseudo-language audio data 108A to evaluate the performance of the customer service representative 103 during a telephone call with the user 101.

The quality assurance system 160 provides a management portal 160A through which an administrative user 105 can evaluate performance alerts. For example, as shown in FIG. 1A, the management portal 160A presents an alert indicating that the user 101 is angry during the telephone conversation with the customer service representative 103. The alert includes a transcript associated with the pseudo-language audio data 108 that identifies features indicating that the user 101 is upset but not the PIN number 106 that the user 101 spoke during the telephone call. In this way, the quality assurance system can process stored audio data to identify information of interest, e.g., performance alerts to be reviewed by the administrative user 105, but not private information.

Figure 1B:
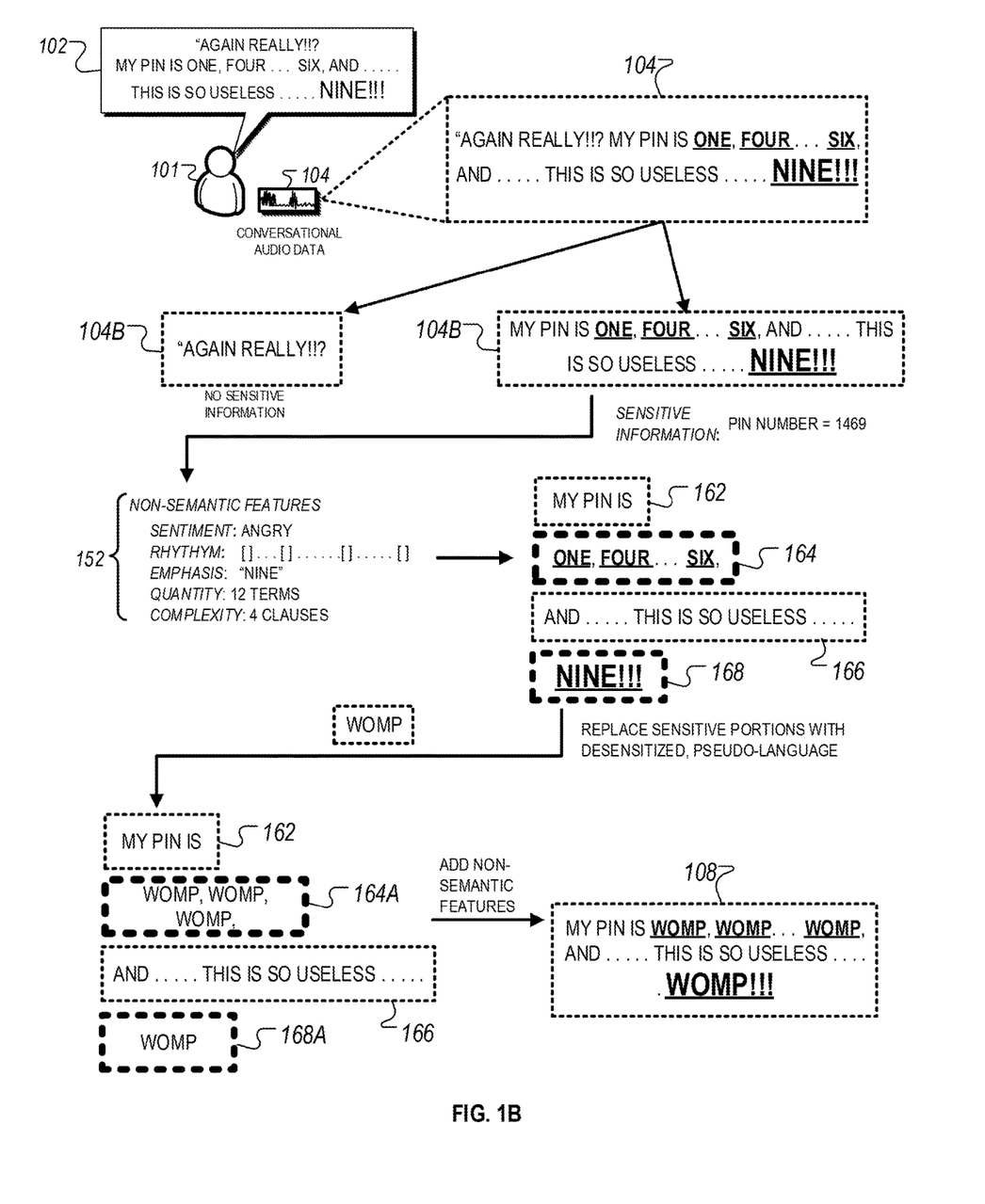
FIG. 1B illustrates an example of a technique for generating pseudo-language audio data for conversational audio data.

FIG. 1B illustrates an example of a technique for generating pseudo-language audio data 108 for audio data 104, as shown in FIG. 1A. In this example, dialogue within the audio data 104 is segmented into multiple portions and evaluated to determine, for each segmented portion, whether a segmented portion involves sensitive information. In the example depicted in FIG. 1B, the audio data 104 is segmented on a sentence-by-sentence basis, although other types of segmentation techniques can also be applied. For example, audio data can be segment on a word-by-word basis, a syllable-by-syllable basis, or some other denominations of speech within audio data.

As shown, audio data 104 is segmented audio segment 104A representing the first sentence spoken by user 101 and audio segment 104B representing the second sentence spoken by the user 101. Each segment is evaluated by a classifier to determine whether it represents likely sensitive audio data. For example, audio segment 104A is classified as not representing sensitive audio data because it represents general speech spoken by the user 101. In contrast, the audio segment 104B is classified as likely representing sensitive audio data since it references a PIN number associated with a sensitive financial accounting of the user 101. The system 100 thereby processes the audio segment 104B to remove sensitive information but does not modify audio segment 104A.

The system 100 parses the audio segment 104B to identify non-semantic features 152 representing distinctive attributes, characteristics, and/or elements present within the audio segment 104B. For instance, the non-semantic features 152 include sentiment of the speaker, speech rhythm, emphasis, quantity of terms, or complexity associated with speech. As discussed below, the non-semantic features 152 can be used to generate desensitized, pseudo-language audio data that retains distinctive aspects of the audio data 104 without including sensitive information.

The system 100 provides each portion of the audio segment 104B to determine locations of sensitive information. In the example depicted in FIG. 1B, the system 100 identifies audio portions 162 and 166 as not being associated with sensitive information and audio portions 164 and 168 as being associated with numbers representing the PIN number.

The system 100 selects audio portions 164 and 168 for further processing using pseudo-language audio data segments. In the example depicted in FIG. 1B, audio representing numbers of a PIN number are replaced with corresponding pseudo-language audio of a gibberish word "WOMP." The system 100 generates pseudo-language audio segment 164A, which includes three gibberish terms, to correspond to audio portion 164, which includes three numbers of the PIN number. Additionally, the system 100 generates pseudo-language audio segment 168A, which includes one gibberish term, to correspond to audio segment 168, which includes a single number of the PIN number.

The system 100 processes pseudo-language audio segments 164A and 168A so that they include identical or similar non-semantic features as audio portions 164 and 168, respectively. For example, the system 100 may introduce space between the two later terms in the pseudo-language audio segment 164A so that the rhythm matches the rhythm of the numbers "ONE," "FOUR," and "SIX." As another example, the system 100 adds emphasis to audio intonations present in pseudo-language audio segment 168A so that it matches the intonations of the user 101 saying the number "NINE." The system combines the audio segments 162, 164A, 166, and 168A to generate pseudo-language audio data 108, which is then stored in lieu of the audio data 104, as discussed above.

The system 100 can use various types of techniques for generating the pseudo-language audio data 108. In some implementations, the system 100 stores a library of pseudo-language segments that are each associated with a set of one or more non-semantic features. In such implementations, the system 100 matches non-semantic features of the audio data 104 to identify pseudo-language audio segments that match a corresponding portion of the audio data 104 that includes sensitive information. The system 100, in these implementations, combines predetermined pseudo-language audio segments with part of the audio data 104 to generate the pseudo-language audio data 108.

In other implementations, the system 100 generates the pseudo-language audio data 108 by modifying the audio data 104 based on non-semantic features identified in the audio data 104. For example, the system 100 can use a portion of the audio data 104 that has sensitive information as a baseline audio file and then add external sounds to a part of the audio data 104 that represents sensitive information, e.g., censoring the audio data 104 by adding a censorship sound.

In some other implementations, the system 100 can generate sounds and/or audio on the fly based on non-semantic features of the audio data 104. For example, the non-semantic features can be used to transform an existing pseudo-language audio to conform to non-semantic features of a corresponding portion of the audio data 104 that can then be combined with other portions of the audio data 104 that do not include sensitive information. For example, a baseline pseudo-language audio with the gibberish term "WOMP" can be elongated and emphasized to mimic the way in which the user 101 says a word that represents sensitive information that requires removal and/or obstruction. In other instances, the portions of the audio data itself can be obscured by using audio processing techniques to render sensitive information indiscernible or incomprehensible. For example, speech audio can be manipulated such that the sounds retain the same acoustic patterns, but the semantic content is rendered indecipherable due to the introduction of noise to the audio.

Figure 2:
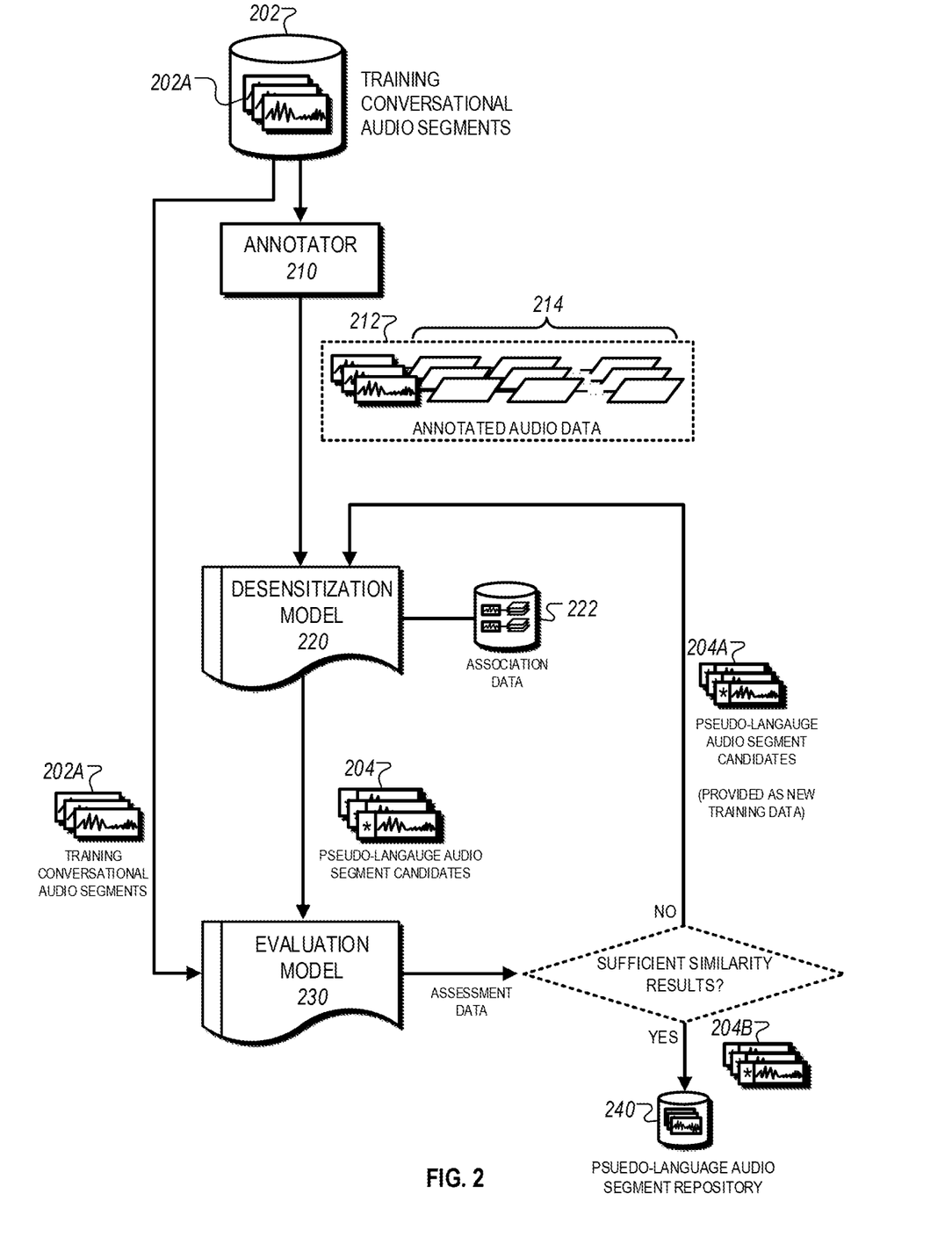
FIG. 2 illustrates an example of a technique for training a desensitization module to generate pseudo-language audio data.

FIG. 2 illustrates an example of a system 200 for training a desensitization module to generate pseudo-language audio data. The system 20) includes an annotator 210, a desensitization model 220, and an evaluation model 230. The system 200 also stores training audio data 202, which includes training conversational audio segments 202A that are used to train the desensitization model 220. In some implementations, the system 200 is a component or sub-system of the system 100 discussed in reference to FIG. 1A. For example, the annotator 210 can perform similar types of operations as discussed above for the audio classifier 120, and the desensitization model 220 can perform similar types of operations as discussed above for the desensitization model 140.

In the example depicted in FIG. 2, the evaluation model 230 is a generative adversarial network (GAN) that is implemented by the system 200 and used to train the desensitization model 220 in, for example, a zero-sum game framework. In this example, the desensitization model 220 generates pseudo-language audio segment candidates 204 for training conversational audio segments 202A (which are associated with a set of known non-semantic features 214 within annotated audio data 212), and the evaluation model 230 uses discriminative techniques to evaluate the performance of the desensitization model 220 by assessing the similarity between corresponding audio segments within the pseudo-language audio segment candidates 204 and the training conversational audio segments 202A, as discussed below.

Once the evaluation model 230 determines that the desensitization model 220 exhibits sufficient performance, e.g., the pseudo-language audio segment candidates 204 and the training conversational audio segments 202A are identified to have sufficient similarity to one another, the training conversational audio segments 202A are stored in a pseudo-language audio segment repository 240 as pseudo-language audio segments 204B, which in some instances, can be used in a run-time process such as the process depicted in FIGS. 1A and 1B.

In more detail, the annotator 210 processes the training conversational audio segments 202A to identify non-semantic features associated with each segment. For example, the annotator 210 can identify sentiments, sentiment patterns, rhythm, tonality, complexity, among other types of non-semantic features of audio data as described herein. In some instances, the non-semantic features can be manually verified by a human user to ensure that annotated training data accurately reflect the non-semantic features that are actually exhibited by the training conversational audio segments 202A. In such instances, the human user may verify the output of the annotator 210 and/or update the identifications by adding new non-semantic features, removing existing non-semantic features, or modifying non-semantic identified features.

The annotator 210 generates annotated audio data 212 based on processing the training audio data 202 and/or manual input provided by a human user. Each audio segment within the annotated audio data 212 is mapped to a set of known non-semantic features 214 for each audio segment. For example, the set of known non-semantic features 214 can include sentiments, sentiment patterns, or acoustic patterns exhibited a corresponding author segment.

The annotator 210 provides the annotated audio data 212 to the desensitization model 220 for training. Different types of techniques can be used to train the desensitization model 220 based in the annotated audio data 212. In some implementations, the system 200 applies a supervised learning technique that involves providing the desensitization model 220 with a target or outcome variable, e.g., desensitized, pseudo-language audio data, that is to be predicted from a given set of predictors, e.g., the set of known non-semantic features 214 for a given audio segment. Using these set of variables, the system 200 can generate a function that map inputs to desired outputs, e.g., desensitized, pseudo-language audio data that is identified as having a sufficient similarity to input audio data. In such implementations, the training process continues until the desensitization model 220 achieves a desired level of accuracy on the annotated audio data 212. Examples of supervising learning techniques that can be applied by the system 200 include, but are not limited to, regressions, decision trees, random forest analysis, KNN, among others.

In other implementations, the system 200 can use unsupervised learning techniques where there is no target or outcome variable to generate a prediction or estimate. In these implementations, training can be used to cluster conversational audio data in different groups, which can be used to assign audio data to different groups for specific types of modification to generate desensitized, pseudo-language audio data, e.g., groups for different types of sensitive information. In some other implementations, the system 200 can use a reinforcement learning technique where the desensitization model 220 is applied to make specific decisions. For example, the system 200 can be exposed to an environment where the model trains itself continually using trial and error and, based on past experience, tries to capture the best possible knowledge to make accurate decision, e.g., using a Markov decision process.

The desensitization model 220 uses association data 222 to generate a set of pseudo-language audio segment candidates 204 for audio segments included in the annotated audio data 212. The association data 222 maps a particular pseudo-language audio segment to a set of one or more non-semantic features exhibited in the particular pseudo-language audio segment. As discussed herein, the desensitization model 220 uses the association data 222 to identify a pseudo-language audio segment as corresponding to an audio segment within the annotated audio data 212, e.g., a pseudo-language audio segment that is predicted to have identical or similar non-semantic features as a set of non-semantic features specified for the audio segment within the annotated audio data.

The evaluation model 230 compares the training conversational audio segments 202A within the training audio data 202 and the pseudo-language audio segment candidates 204 generated by the desensitization model 220 to generate assessment data for the performance of the desensitization model 220. The assessment data may include a set of similarity determinations between a particular audio segment and a corresponding pseudo-language audio segment to determine whether the desensitization model 220 exhibits sufficient performance and is therefore trained to generate pseudo-language audio data with sufficient accuracy. For example, the evaluation model 230 may identify non-semantic features of the pseudo-language audio segment candidates 204 and compare the identified non-semantic features to known non-semantic features of the training conversational audio segments 202A to determine one or more similarity measures, e.g., whether acoustic features of a pseudo-language audio segment matches the acoustic features of a corresponding audio segment based on which the desensitization model 220 generates the pseudo-language audio segment.

The evaluation model 230 handles the output of the desensitization model 220 based on the information included in the assessment data. For example, in some instances where the assessment data indicates that the pseudo-language audio segment candidates 204 do not have a sufficient similarity to the training conversational audio segments 202A, the evaluation model 230 determines that the desensitization model requires further training to exhibit sufficiently accurate performance. In such instances, the system 200 can use a recursive training technique in which the pseudo-language audio segment candidates 204 (and their associated non-semantic features as identified by the evaluation model 230) are provided as additional input training data to the desensitization model 220, e.g., as pseudo-language audio segment candidates 204A. The system 200, in such instances, repeats training of the desensitization model 220 and assessment of the output as determined by the evaluation model 230 until the evaluation model 230 determines a similarity between the output of the desensitization model 220 and training conversational audio segments 202A.

Alternatively, in other instances where the assessment data indicates that the pseudo-language audio segment candidates 204 have a sufficient similarity to the training conversational audio segments 202A, the evaluation model 230 determines that the desensitization model does not require further training. In such instances, the pseudo-language audio segment candidates 204 can be stored in the pseudo-language audio segment repository 240 for use in a runtime process where the desensitization model 220 generates desensitized, pseudo-language audio data for received conversation audio data, as discussed above in reference to FIGS. 1A and 1B.

Figure 3:
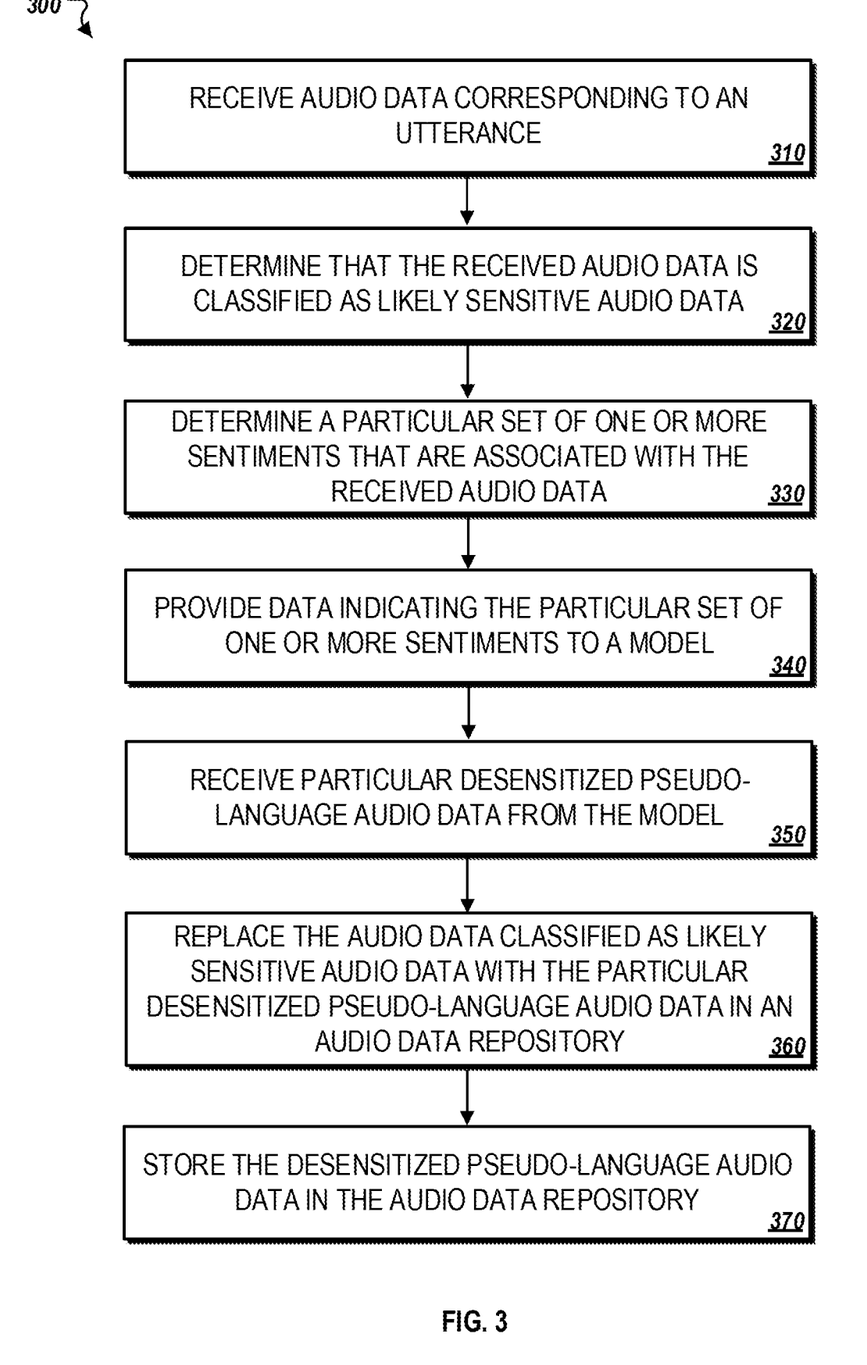
FIG. 3 illustrates an example of a process for generating pseudo-language audio data for conversational audio data.

FIG. 3 illustrates an example of a process 300 for generating pseudo-language audio data for conversational audio data. The process 300 can include the operations of receiving audio data corresponding to an utterance (310), determining that the received audio data is classified as likely sensitive audio data (320), determining a particular set of one or more sentiments that are associated with the received audio data (330), providing data indicating the particular set of one or more sentiments to a model (340), receiving particular desensitized pseudo-language audio data from the model (350), replacing the audio data classified as likely sensitive audio data with the particular desensitized pseudo-language audio data in an audio data repository (360), and storing the desensitized pseudo-language audio data in the audio data repository (370).

In general, the process 300 is described below in reference to system 100, although other types of audio processing systems can be configured to perform the operations of the process 300. For example, a system that processes conversational audio data can be configured to exchange data communications with a desensitization model so that sensitive information associated with the conversational audio data can be removed, obscured, or otherwise rendered unidentifiable while preserving non-semantic features, such as sentiments, sentiment patterns, or acoustic features. In some implementations, the components of the system 100, such as the audio segmenter 110, the audio classifier 120, and the desensitization model 140, perform distinct operations of the process 300. For example, the audio classifier 120 can process semantic content represented by the conversational audio data to determine whether the conversational audio data includes sensitive information, and the audio classifier 120 can parse distinct segments of the conversational audio data to identify sentiments that are associated with each segment. In other implementations, multiple components of the system 100 can be configured to perform a single operation of the process 300, or alternatively, a single component can perform multiple operations of the process 300.

The process 300 can include the operations of receiving audio data corresponding to an utterance (310). For example, the audio segmenter 110 can receive audio data 104 corresponding to an utterance spoken by user 101. In the example depicted in FIG. 1A, the audio data 104 is recorded audio data of a customer service call between the user 101 and a customer service representative 103. During the telephone conversation, the user 101 provides dialogue 102 and the semantic content of the audio data 104.

The process 300 can include the operation of determining that the received audio data is classified as likely sensitive audio data (320). For example, the audio classifier 120 can determine that the received audio data 104 is classified as likely sensitive audio data. This determination can be based on parsing the semantic content associated with the received audio data 104 and identifying one or more portions of the semantic content as representing sensitive information. In the example depicted in FIG. 1A, the audio classifier 120 determines that the semantic content of the audio data 104 includes a PIN number 106 provided by the user 101 associated with a financial account of the user 101. The audio classifier 120, in this example, determines that audio segment 1046 of the audio data 104 as likely sensitive audio data.

In some implementations, the audio classifier 120 can be trained to output, for each of different types of semantic content, a score representing a likelihood that semantic content represents sensitive information. For example, the audio classifier 120 can be trained based on training that data that includes known positive examples of sensitive information, e.g., social security numbers, credit card numbers, home addresses, or other types of information that a user would consider private, as well as negative examples of non-sensitive information, e.g., publicly available information, product names, trademarks, advertising content, etc. In such implementations, the score outputted by the audio classifier 120 represents a determined probability that received audio data 104 includes sensitive information. The audio classifier 120 can additionally use a threshold value for the score to determine whether the received audio data 104 includes sensitive information. For example, received audio data that is determined to have a score that exceeds the threshold value can be determined to likely represent sensitive audio data. Alternatively, received audio data that is determined to have a score that does not exceed the threshold value can be determined to not likely represent sensitive audio data.

The process 300 can include the operation of determining a particular set of one or more sentiments that are associated with the received audio data (330). For example, the audio classifier 120 can identify a set of sentiments 109 that are associated with the received audio data 104. The sentiments can be determined based on parsing the audio data 104 to identify non-semantic features 152, as discussed in reference to FIG. 1B. In some instances, the non-semantic features 152 can include other types of information, such as acoustic features, and sentiment patterns represented by the associated sentiments.

The process 300 can include the operation of providing data indicating the particular set of one or more sentiments to a model (340). For example, the audio classifier 120 can provide data indicating the set of sentiments 109 to the desensitization model 140. As described throughout, the desensitization model 140 can be trained to output, for each of different sets of sentiments, desensitized, pseudo-language audio data that exhibits the set of sentiments and is not classified as likely sensitive audio data.

The process 300 can include the operation of receiving particular desensitized pseudo-language audio data from the model (350). For example, the system 100 receives desensitized, pseudo-language audio data 108 generated by the desensitization model 140. As shown in FIG. 1A, the pseudo-language audio data 108 exhibits intonations for certain words that reflect frustration and anger of the user 101 during the telephone conversation with the customer service representative 103. However, the pseudo-language audio data 108 is not classified as likely sensitive audio data since individual numbers spoken by the user 101 have been obfuscated with a pseudo-language term "WOMP."

The process 300 can include the operation of replacing the audio data classified as likely sensitive audio data with the particular desensitized pseudo-language audio data in an audio data repository (360). For example, the system 100 can replace the audio data 104 within the conversational data repository 150 with the pseudo-language audio data 108. As discussed throughout, the pseudo-language audio data 108 can be stored in lieu of the received audio data 104 so that sensitive information is not stored in the conversational data repository 150. However, since the pseudo-language audio data 108 include similar non-semantic features, e.g., associated sentiments and sentiment patterns, as the received audio data 104, systems that process information stored in the conversational data repository 150 can use audio processing techniques to identify information of interest without having access to sensitive information. In the example depicted in FIG. 1A, the quality assurance system 160 identifies an alert indicating that the user 101 is upset during a customer service call without having access to the PIN number provided by the user 101. The process 300 can include the operation of storing the desensitized pseudo-language audio data in the audio data repository (370). For example, the system 100 can store the pseudo-language audio data 108 in the conversational data repository 150 in association with the utterance provided by the user 101.

In some implementations, the audio classifier 120 can determine a sentiment pattern represented by the set of sentiments 109 that are determined to be associated with the received audio data 104. A sentiment pattern can represent, for example, an order of sentiments that are present in the received audio data 104 based on dialogue progression, e.g., a user is upset prior to being happy during a telephone conversation. In other examples, the sentiment pattern can identify a prominent sentiment from among multiple sentiments that are determined to be associated with the received audio data 104, or the effect of speech provided by the customer service representative 103 on the user 101 during a telephonic conversation. In such implementations, the pseudo-language audio data 108 generated by the desensitization model 140 exhibits an identical or similar sentiment pattern as the sentiment pattern determined by the audio classifier 120 for the received audio data. For example, if the received audio data 104 indicates that dialogue provided by the user 101 indicates that he/she is upset, and then happy three seconds later, the pseudo-language audio data 108 can be generated such that a similar order of sentiments is exhibited without the underlying semantic content.

In some implementations, the received audio data 104 is segmented into multiple audio segments to improve the identification of sensitive information and/or the generation of pseudo-language audio data 108. In the example depicted in FIGS. 1A and 1B, the received audio data 104 is segmented into two audio segments 104A and 104B. In this example, audio segment 104A is not determined to include sensitive audio data while audio segment 104B is determined to include sensitive audio data. As shown in FIG. 1B, based on these determinations, the system 200 proceeds with processing the audio segment 104B to remove sensitive information but does not further process the audio segment 104A since it is determined to include not sensitive information. The multiple audio segments can represent different divisible elements of the received audio data 104, e.g., audio corresponding to individual words, audio corresponding to individual sentences, among others.

In some implementations, the desensitization model 140 generates the desensitized, pseudo-language audio data by combining multiple pseudo-language segments that correspond to individual portions of the received audio data 104. For instance, in the example depicted in FIG. 1B, four audio portions 162, 164, 166, and 168 are identified for the audio segment 104B, of which audio portions 164 and 168 are determined to be associated with sensitive information. In this example, pseudo-language audio segments 164A and 168A are generated for audio portions 164 and 168, respectively. As discussed herein, in some instances, the desensitization model 140 generates the pseudo-language audio segments 164A and 168A by modifying the audio portions 164 and 168. In other instances, the desensitization model 140 generates the pseudo-language audio segments 164A and 168A by accessing a repository of pseudo-language segments, e.g., pseudo-language audio segment repository 240, and selecting pseudo-language segments with non-semantic features that match, or are similar to, the non-semantic features of corresponding portions of the audio segment 104B.

Figure 4:
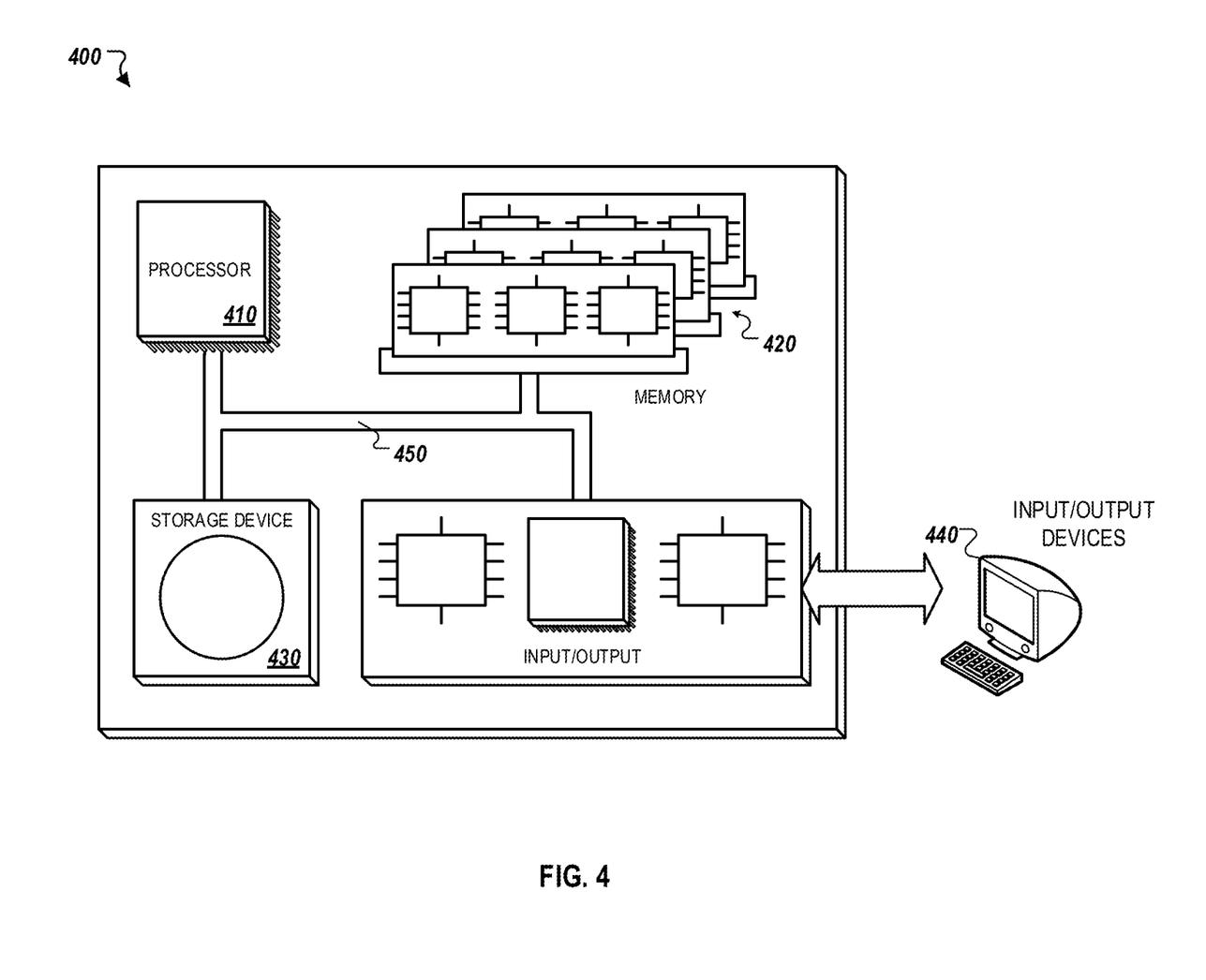
FIG. 4 illustrates examples of components on which the techniques described herein can be implemented.

FIG. 4 is a schematic diagram of a system 400. The system 400 can be used to carry out the operations described in association with any of the computer-implemented methods described previously, according to some implementations. In some implementations, computing systems and devices and the functional operations described in this specification can be implemented in digital electronic circuitry, in tangibly embodied computer software or firmware, in computer hardware, including the structures disclosed in this specification (e.g., system 400) and their structural equivalents, or in combinations of one or more of them. The system 400 is intended to include various forms of digital computers, such as laptops, desktops, workstations, personal digital assistants, servers, blade servers, mainframes, and other appropriate computers, including vehicles installed on base units or pod units of modular vehicles. The system 400 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 400 includes a processor 410, a memory 420, a storage device 430, and an input/output device 440. Each of the processor 410, memory 420, storage device 430, and input/output device 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A computer-implemented method comprising:
receiving audio data corresponding to an utterance of a caller from a conversation with an operator after a call connection from the caller to the operator;
determining that the received audio data is classified as likely sensitive audio data;
after determining that the received audio data is classified as likely sensitive data, determining a particular set of one or more sentiments that are reflected in the received audio data that is classified as likely sensitive audio data during the call;
providing data indicating the particular set of one or more sentiments that are associated with the received audio data that is classified as likely sensitive audio data, to a model that is trained to output, for each of different input sets of sentiments, desensitized, pseudo-language audio data that (i) exhibits the same, input set of sentiments, and (ii) is not classified as likely sensitive audio data;
receiving, from the model, particular desensitized, pseudo-language audio data that (i) exhibits the same, particular set of one or more sentiments that are reflected in the received audio data that is classified as likely sensitive audio data, and (ii) is not classified as likely sensitive audio data;
replacing the audio data that is classified as likely sensitive audio data with the particular desensitized, pseudo-language audio data within an audio data repository; and
storing the particular desensitized, pseudo-language audio data in the audio data repository in association with the utterance.

2. The method of claim 1, further comprising:
determining a particular sentiment pattern represented by the particular set of one or more sentiments that are associated with the received audio data that is classified as likely sensitive audio data,
wherein the pseudo-language audio data exhibits a sentiment pattern that satisfies a threshold similarity to the particular sentiment pattern represented by the particular set of one or more sentiments that are associated with the received audio data that is classified as likely sensitive audio data.

3. The method of claim 2, wherein the particular sentiment pattern specifies (i) one or more audio segments of the received audio data that is classified as likely sensitive audio data, and (ii) a subset of the particular set of one or more sentiments that are associated with each of the one or more audio segments.

4. The method of claim 2, wherein the model outputs the particular desensitized, pseudo-language audio data by:
identifying a set of non-semantic features represented by one or more portions of the audio data that are classified as likely sensitive audio data;
identifying, for each sentiment included in the particular set of one or more sentiments, a set of pseudo-language segments that are determined to be associated with the same sentiment;
selecting, from among the identified sets of pseudo-language segments, a particular subset of pseudo-language segments based on the identified set of non-semantic features represented by the audio data corresponding to the utterance; and
generating the particular desensitized, pseudo-language audio data based on combining the particular subset of pseudo-language segments.

5. The method of claim 4, wherein the particular subset of pseudo-language segments includes at least one pseudo-language segment that is determined to be associated with a sentiment included in the particular set of one or more sentiments.

6. The method of claim 1, wherein determining that the received audio data is classified as likely sensitive audio data comprises:
determining a particular semantic content associated with the utterance;
providing data indicating the particular semantic content associated with the utterance to a classifier that is trained to output, for each of different types of semantic content, a score representing a likelihood that semantic content represents sensitive information;
receiving, from the classifier, a particular score computed for the particular semantic content associated with the utterance; and
determining that the particular score satisfies a threshold associated with sensitive audio data.

7. The method of claim 1, wherein:
the audio data comprises one or more audio segments; and
determining the particular set of one or more sentiments that are associated with the received audio data that is classified as likely sensitive audio data comprises determining, for each of the one or more audio segments, a particular subset of one or more sentiments that are associated with the audio segment.

8. The method of claim 7, wherein each segment from among the one or more segments comprises a word associated with a transcription of the utterance.

9. The method of claim 8, wherein each segment from among the one or more segments comprises a sentence associated with a transcription of the utterance.

10. A system comprising:
one or more computers; and one or more storage devices storing instructions that, when executed by the one or more computers, cause the one or more computers to perform operations comprising:
- receiving audio data corresponding to an utterance of a caller from a conversation with an operator after a call connection from the caller to the operator;
- determining that the received audio data is classified as likely sensitive audio data;
- after determining that the received audio data is classified as likely sensitive data, determining a particular set of one or more sentiments that are reflected in the received audio data that is classified as likely sensitive audio data during the call;
- providing data indicating the particular set of one or more sentiments that are associated with the received audio data that is classified as likely sensitive audio data, to a model that is trained to output, for each of different input sets of sentiments, desensitized, pseudo-language audio data that (i) exhibits the same, input set of sentiments, and (ii) is not classified as likely sensitive audio data;
- receiving, from the model, particular desensitized, pseudo-language audio data that (i) exhibits the same, particular set of one or more sentiments that are reflected in the received audio data that is classified as likely sensitive audio data, and (ii) is not classified as likely sensitive audio data;
- replacing the audio data that is classified as likely sensitive audio data with the particular desensitized, pseudo-language audio data within an audio data repository; and
- storing the particular desensitized, pseudo-language audio data in the audio data repository in association with the utterance.

11. The system of claim 10, wherein the operations further comprise:
- determining a particular sentiment pattern represented by the particular set of one or more sentiments that are associated with the received audio data that is classified as likely sensitive audio data,
- wherein the pseudo-language audio data exhibits a sentiment pattern that satisfies a threshold similarity to the particular sentiment pattern represented by the particular set of one or more sentiments that are associated with the received audio data that is classified as likely sensitive audio data.

12. The system of claim 11, wherein the particular sentiment pattern specifies (i) one or more audio segments of the received audio data that is classified as likely sensitive audio data, and (ii) a subset of the particular set of one or more sentiments that are associated with each of the one or more audio segments.

13. The system of claim 11, wherein the model outputs the particular desensitized, pseudo-language audio data by:
- identifying a set of non-semantic features represented by one or more portions of the audio data that are classified as likely sensitive audio data;
- identifying, for each sentiment included in the particular set of one or more sentiments, a set of pseudo-language segments that are determined to be associated with the same sentiment;
- selecting, from among the identified sets of pseudo-language segments, a particular subset of pseudo-language segments based on the identified set of non-semantic features represented by the audio data corresponding to the utterance; and
- generating the particular desensitized, pseudo-language audio data based on combining the particular subset of pseudo-language segments.

14. The system of claim 13, wherein the particular subset of pseudo-language segments includes at least one pseudo-language segment that is determined to be associated with a sentiment included in the particular set of one or more sentiments.

15. The system of claim 10, wherein determining that the received audio data is classified as likely sensitive audio data comprises:
- determining a particular semantic content associated with the utterance;
- providing data indicating the particular semantic content associated with the utterance to a classifier that is trained to output, for each of different types of semantic content, a score representing a likelihood that semantic content represents sensitive information;
- receiving, from the classifier, a particular score computed for the particular semantic content associated with the utterance; and
- determining that the particular score satisfies a threshold associated with sensitive audio data.

16. A non-transitory computer-readable storage device encoded with computer program instructions that, when executed by one or more computers, cause the one or more computers to perform operations comprising:
- receiving audio data corresponding to an utterance of a caller from a conversation with an operator after a call connection from the caller to the operator;
- determining that the received audio data is classified as likely sensitive audio data;
- after determining that the received audio data is classified as likely sensitive data, determining a particular set of one or more sentiments that are reflected in the received audio data that is classified as likely sensitive audio data during the call;
- providing data indicating the particular set of one or more sentiments that are associated with the received audio data that is classified as likely sensitive audio data, to a model that is trained to output, for each of different input sets of sentiments, desensitized, pseudo-language audio data that (i) exhibits the same, input set of sentiments, and (ii) is not classified as likely sensitive audio data;
- receiving, from the model, particular desensitized, pseudo-language audio data that (i) exhibits the same, particular set of one or more sentiments that are reflected in the received audio data that is classified as likely sensitive audio data, and (ii) is not classified as likely sensitive audio data;
- replacing the audio data that is classified as likely sensitive audio data with the particular desensitized, pseudo-language audio data within an audio data repository; and
- storing the particular desensitized, pseudo-language audio data in the audio data repository in association with the utterance.

17. The device of claim 16, wherein the operations further comprise:
- determining a particular sentiment pattern represented by the particular set of one or more sentiments that are associated with the received audio data that is classified as likely sensitive audio data,
- wherein the pseudo-language audio data exhibits a sentiment pattern that satisfies a threshold similarity to the particular sentiment pattern represented by the particular set of one or more sentiments that are associated with the received audio data that is classified as likely sensitive audio data.

18. The device of claim 17, wherein the particular sentiment pattern specifies (i) one or more audio segments of the received audio data that is classified as likely sensitive audio data, and (ii) a subset of the particular set of one or more sentiments that are associated with each of the one or more audio segments.

19. The device of claim 17, wherein the model outputs the particular desensitized, pseudo-language audio data by:
- identifying a set of non-semantic features represented by one or more portions of the audio data that are classified as likely sensitive audio data;
- identifying, for each sentiment included in the particular set of one or more sentiments, a set of pseudo-language segments that are determined to be associated with the same sentiment;
- selecting, from among the identified sets of pseudo-language segments, a particular subset of pseudo-language segments based on the identified set of non-semantic features represented by the audio data corresponding to the utterance; and
- generating the particular desensitized, pseudo-language audio data based on combining the particular subset of pseudo-language segments.

20. The device of claim 19, wherein the particular subset of pseudo-language segments includes at least one pseudo-language segment that is determined to be associated with a sentiment included in the particular set of one or more sentiments.

* * * * *